May 27, 1952

R. E. BAILEY 2,598,208

DUCT STATIC PRESSURE CONTROL

Filed Jan. 23, 1950

Revilo E. Bailey
INVENTOR.

BY
Attorneys

May 27, 1952
R. E. BAILEY
2,598,208
DUCT STATIC PRESSURE CONTROL
Filed Jan. 23, 1950
2 SHEETS—SHEET 2
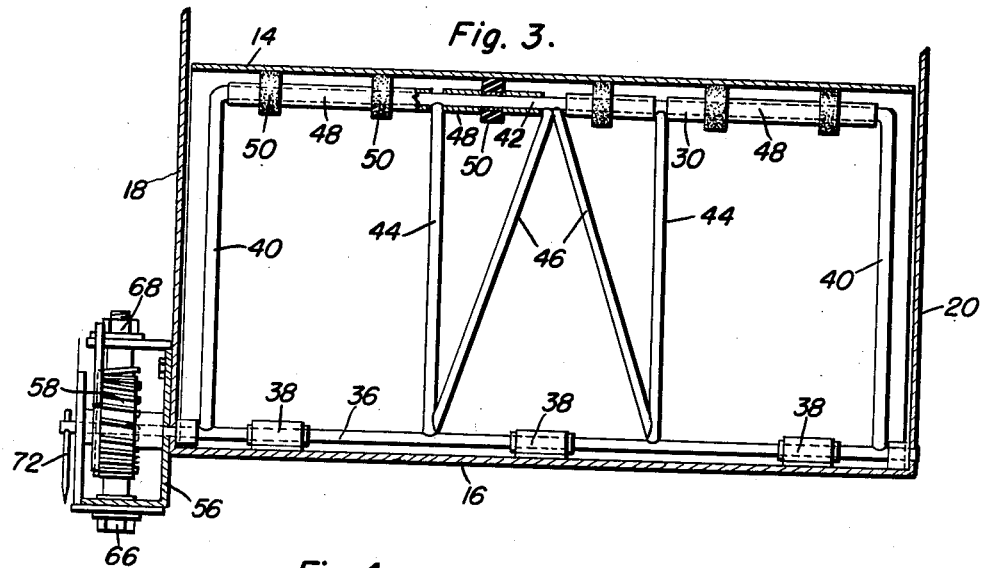
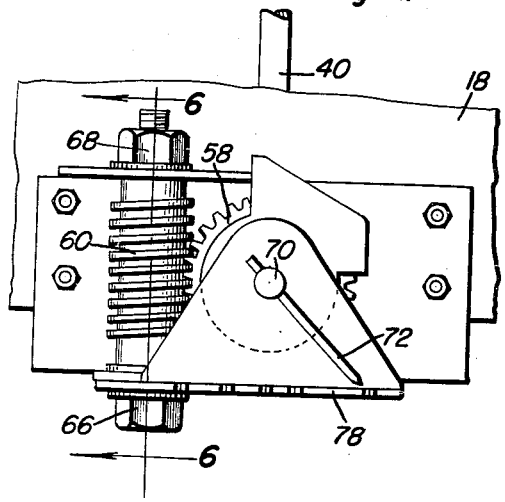
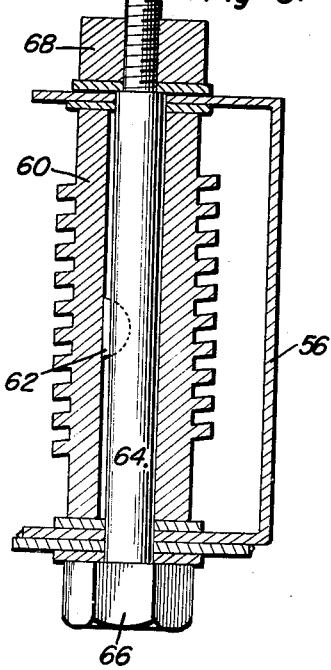
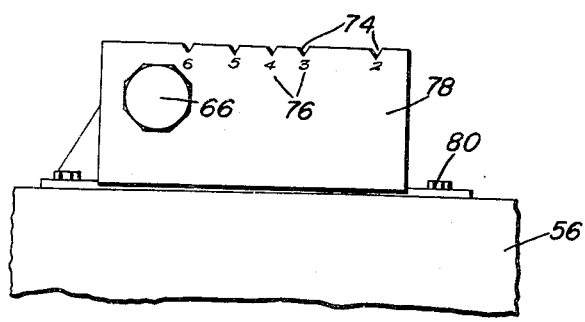
Revilo E. Bailey
INVENTOR.
BY Clarence A. O'Brien
and Harvey B. Jacobson
Attorneys Patented May 27, 1952

2,598,208

UNITED STATES PATENT OFFICE 2,598,208

DUCT STATIC PRESSURE CONTROL

Revilo E. Bailey, Tulsa, Okla., assignor of one-half to Joseph N. Thompson, Tulsa, Okla.

Application January 23, 1950, Serial No. 140,139

4 Claims. (Cl. 138—45)

This invention comprises novel and useful improvements in a duct static pressure control and more specifically pertains to an advantageous and improved flow control valve for the ducts of air conditioning systems and the like.

The primary object of this invention is to provide an improved control valve for controlling flow in ducts, such as the ducts for air conditioning systems, which shall be effective for regulating the effective cross sectional area of a duct with a minimum of deleterious effects upon the flow of air therein.

A further object of the invention is to provide an improved regulating valve for ducts in conformity with the foregoing object which shall in all positions and degrees of its duct controlling operation be adapted to attain the desired flow or pressure control in the duct with a minimum of harmful disturbance of the fluid flow therethrough; yet which may be easily and effectively and extremely accurately adjusted in its controlling effect.

A still further object of the invention is to provide an improved control valve in conformity with the foregoing objects wherein the control valve shall be of a nature to be uneffected or harmed by the flow of fluid through the duct.

These, together with various features and objects of the invention which will later become apparent as the following description proceeds, are attained by the present invention, a preferred embodiment of which has been illustrated by way of example only in the accompanying drawings, wherein:

Figure 3 is a vertical transverse sectional view taken substantially upon the plane indicated by the section line 3—3 of Figure 1 and illustrating further features of the construction of the control valve in accordance with this invention;

Figure 4 is a fragmentary elevational view showing a portion of the valve regulating means;

Figure 5 is an elevational view taken substantially from the right of Figure 4; and Figure 6 is a vertical transverse sectional view taken substantially upon the plane indicated by the section line 6—6 of Figure 4.

Figures 1, 2:
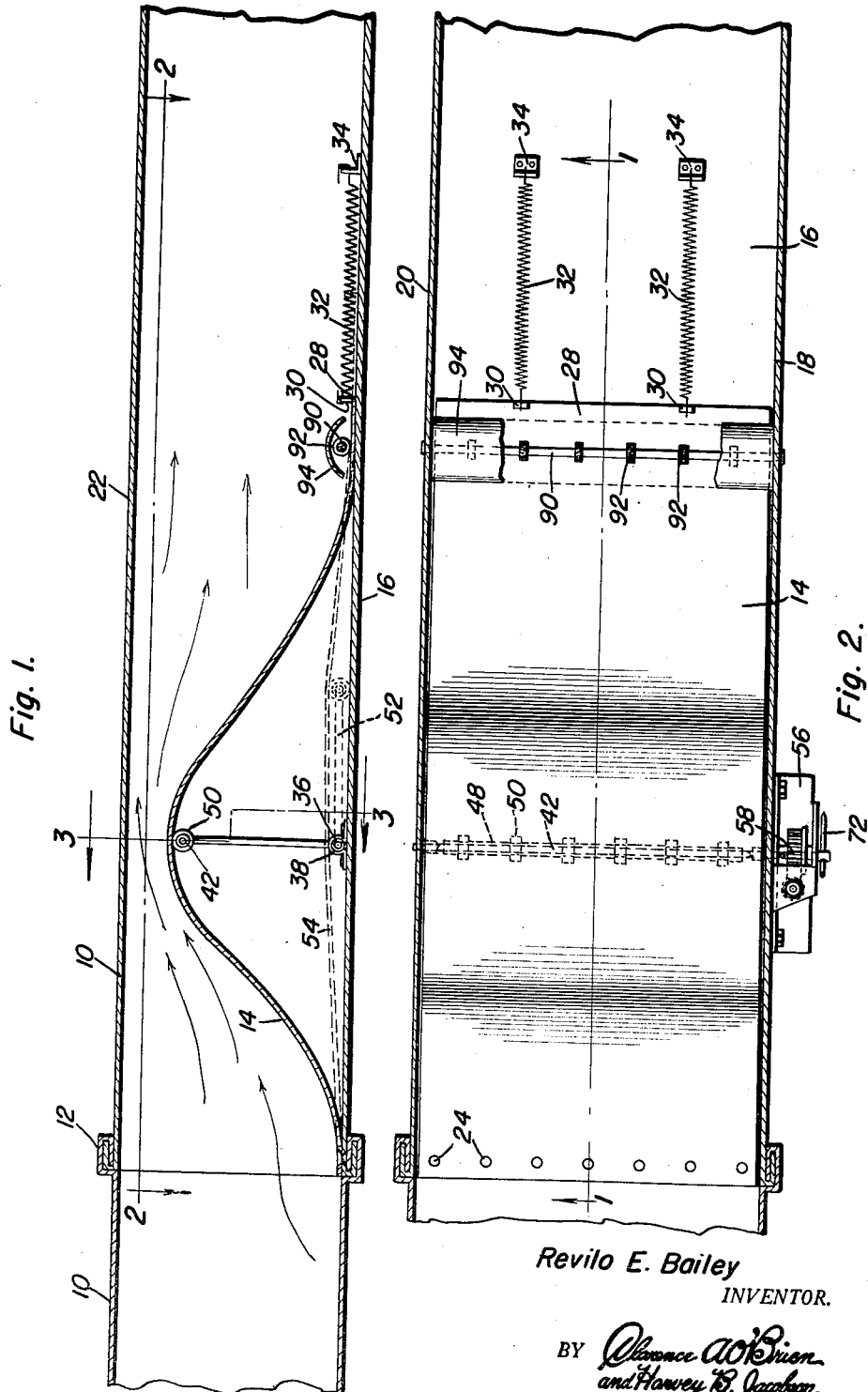
Figure 1 is a vertical central longitudinal sectional view through a portion of a sheet metal duct showing the improved regulating valve disposed therein in a manner to produce the maximum throttling effect on the flow of fluid through the duct, the same being taken substantially upon the plane indicated by the section line 1—1 of Figure 2.
Figure 2 is a horizontal sectional view taken substantially upon the plane indicated by the section line 2—2 of Figure 1.

Referring now more specifically to the accompanying drawings, wherein like numerals designate similar parts throughout the various views, it will be seen that there has been disclosed a portion of a sheet metal duct consisting of sheet metal conduits or duct sections 10 which are detachably joined to each other as by joints 12 of any desired character, these sections forming part of any suitable fluid circulating system such as an air conditioning system or the like.

The purpose of this invention is to provide an improved construction of valve which is specifically adapted for regulating the effective cross sectional area of a section 10 in order to interpose an adjustable resistance to the flow of fluid therethrough and thus maintain a static head in the system, without however adversely affecting the characteristic fluid flow, it being primarily important to avoid creating turbulence or eddies in the flow of fluid past the valve.

Accordingly, the valve forming the subject of this invention consists of a flexible diaphragm or sheet 14 preferably of sheet metal or the like, although any other suitable flexible and pliable material may be employed which is impervious to any fluid flowing through the ducts.

As illustrated in Figure 3, the duct section 12 is preferably rectangular in cross section, although the principles of this invention are not limited to any particular cross sectional shape of duct. Referring now to Figure 3, it will be seen the numeral 16 designates what may be termed the floor of this duct, which thus is provided with side walls 18 and 20, and as shown in Figure 1, with a top wall 22. The flexible diaphragm or sheet 14 is likewise preferably rectangular in shape as will be apparent from Figures 1 and 2, and at one end, is secured to the bottom wall 16 as by rivets or the like 24, so that what may be termed the front end of the sheet is firmly and fixedly secured to the bottom wall of the duct. Preferably, although not necessarily, the riveted front edge of the sheet 14 is disposed substantially at the joint 12 for convenience in obtaining access to and servicing the flexible sheet forming the valve member.

At its other end, the flexible sheet 14 is provided with a transversely disposed member or portion 28 which may consist of an upturned flange at that end of the sheet 14, or may comprise a separate angle iron member suitably secured thereto. This member 28 extending transversely of and across substantially the entire width of the bottom wall 16 of the duct, is provided with lugs 30 to which are secured the extremities of tension springs 32, whose other ends are anchored in lugs 34 riveted or otherwise secured to an appropriate portion of the bottom wall 16, as will be readily understood from Figures 1 and 2. The arrangement is such that normally the tension of the springs 32 serves to urge the flexible and pliable sheet metal member 14 into flat continuous engagement with the bottom wall 16, except as the same is elevated as set forth hereinafter.

It will now be seen that when the sheet metal member 14 is flat against the bottom wall 16, there is no resistance to the flow of fluid through the duct, and the control valve may be considered to be in its fully open position. When however it is desired to throttle the flow through the duct, the mid portion of the flexible sheet 14 is forced transversely of the duct from the bottom wall 16 towards the top wall 22 thereof, as shown in Figure 1, and this transverse movement is permitted by extension of the springs 32.

A vane is provided for selectively and adjustably moving the mid portion of the flexible sheet 14 from the bottom wall towards the top wall of the duct, and across the entire width of the same. This vane, as seen best from Figures 1 and 3, consists of a rod or shaft framework having a bottom rod 36 rotatably secured to the bottom wall 16 as by suitable journal bearings 38, attached thereto in any desired manner.

The vane further includes arm portions 40 which are connected with the above mentioned rod 36, and which are in turn engaged by a further rod member 42 disposed in parallel relation to the rod 36.

Suitable reinforcing rods 44 and 46 serve to connect the rods 42 and 36 intermediate their ends to provide a rigid substantially rectangular framework constituting the vane. Journaled upon the rod 42 are sleeves 48 upon which are secured a plurality of rollers 50 which may be of rubber or the like, and which are secured in any desired manner to the exterior surfaces of the sleeves 48.

One end of the shaft 36 extends through the side wall 18 of the duct, while the other end of the shaft is journaled in the other side wall 20 as will be apparent from Figure 3. It will now be understood that the vane may be selectively disposed in a flat position as shown in dotted lines at 52 in Figure 1, at which time the tension of the spring 32 will urge the flexible valve member 14 into its flat position as shown in dotted lines at 54 in Figure 1, the valve thus offering the minimum resistance to flow through the duct and being positioned in its fully open position therein.

Obviously as the shaft 36 is rotated by means to be subsequently described, the vane will be rotated about the axis of the shaft 36, and the rollers 50 will roll against the undersurface of the mid portion of the flexible sheet 14, and thus will selectively elevate the same from the bottom 16 towards the top wall 22 of the duct, until the vane is disposed perpendicular with respect to the bottom wall 16, at which time the diaphragm or flexible valve member 14 will assume the position shown in Figure 1, and will offer the maximum resistance to flow through the duct. It should be here recognized that by virtue of the flexibility of the sheet 14, the valve in its fully closed position, while offering the maximum restriction of flow for the duct, will have smooth and streamlined surfaces on both the up and downstream side of the valve, thus avoiding the creation of turbulence or eddies currents in the flow, while effectively throttling the duct.

The means for adjusting and regulating the valve are disclosed more clearly in Figures 3-6. The same includes a suitable supporting bracket or casing 56 secured to the wall 18 of the duct, the shaft 36 extending through and being journaled in this bracket casing. Fixedly secured to the extending portion of the shaft 36, is a pinion gear 58 which is continuously in mesh with a worm gear 60, keyed as at 62 to an adjusting shaft 64 likewise journaled in the bracket casing 56. The adjusting shaft 64 is provided with a bolt head 66 by means of which the same may be rotated, to thereby rotate the worm gear 60, and where this shaft extends through the other side of the bracket casing, it is provided with a lock nut 68 by means of the adjusting shaft may be clamped to the casing in adjusted position.

It will thus be seen that by loosening the nut 68, the bolt head 66 may be rotated, thereby rotating the worm gear, and through its engagement with the pinion 58 causing rotation of the shaft 36, and thereby causing pivotal movement of the vane about the axis of the shaft 36 to adjustably position the mid portion of the flexible valve sheet 14. When the desired adjusted position has been attained, the lock nut will of course be tightened, thereby securing the valve in adjusted position.

In order to adequately determine the extent of adjustment desired and obtained by the device, the extremity of the shaft 36, as indicated at 70, is provided with a finger or pointer 72 which is adapted to move across a series of graduated notches 74 having suitable indicia 76, these notches being formed in the edge of an upstanding plate 78, secured as at 80 to the above mentioned housing or bracket casing 56.

In the arrangement as so far described it will now be apparent that when the member 14 is moved to the position shown in Figure 1, that the tension of the springs 32 will serve to cause the end of the member to be disposed in a substantially straight line between the positions of the elements 34 and 50. In order to hold the end of the diaphragm or member 14 against the bottom wall 16, a novel and improved hold down device is provided.

This hold down device conveniently and preferably comprises a transversely extending rod or shaft 90 having its ends suitably journalled in the side walls 18 and 20 of the conduit, and adjacent the bottom wall 16 thereof, this shaft having a plurality of rollers such as rubber wheels or the like 22 rotatably journalled thereon, the lower surfaces of these rollers being spaced a slight distance above the bottom wall 16, as will be apparent from Figure 1, in order to receive the end of the sheet member 14 therebetween. The rollers thus serve as antifriction means holding the extremity of the sheet 14 downwardly against the bottom wall 16, while permitting relative sliding movement between the sheet and the bottom wall. A transversely extending arcuate shield or guard 94 of sheet metal or any other suitable material is secured between the side walls 18 and 20 in any suitable manner immediately above the shaft 90 and the rollers 92 thereon in order to impart a streamlined effect to this extremity of the sheet 14. This metallic guard or shield thus serves to minimize turbulence or disturbance of the air stream flowing through the conduit and over the rollers and shaft 92 and 90.

From the foregoing, the construction and operation of the device together with its many advantages will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A regulating valve for ducts comprising a pliable sheet, means fixedly securing one end of said sheet to the wall of a duct, resilient means engaging an opposite end of the sheet and yieldingly extending said sheet along said wall of the duct, operating means engaging said sheet between said two first mentioned means for moving the mid portion of said sheet transverse said duct to throttle the cross sectional area thereof, said operating means comprising a vane disposed between said sheet and said wall, said vane being oscillatable to cause said transverse movement of said sheet, said vane having rollers journaled thereon for engaging said sheet.

2. A regulating valve for ducts comprising a pliable sheet, means fixedly securing one end of said sheet to the wall of a duct, resilient means engaging an opposite end of the sheet and yieldingly extending said sheet along said wall of the duct, operating means engaging said sheet between said two first mentioned means for moving the mid portion of said sheet transverse said duct to throttle the cross sectional area thereof, said operating means comprising a vane disposed between said sheet and said wall, said vane being oscillatable to cause said transverse movement of said sheet, said vane including a rocker shaft extending transverse the duct and journaled in the walls thereof.

3. A regulating valve for ducts comprising a pliable sheet, means fixedly securing one end of said sheet to the wall of a duct, resilient means engaging an opposite end of the sheet and yieldingly extending said sheet along said wall of the duct, operating means engaging said sheet between said two first mentioned means for moving the mid portion of said sheet transverse said duct to throttle the cross sectional area thereof, said operating means comprising a vane disposed between said sheet and said wall, said vane being oscillatable to cause said transverse movement of said sheet, said vane including a rocker shaft extending transverse the duct and journaled in the walls thereof, means for oscillating said shaft comprising a pinion gear secured thereto, a worm gear meshing with said pinion and means for locking said worm in adjusted positions.

4. A flow restrictor for ducts having top, bottom and side walls comprising a pliable sheet fixedly attached at one end to said bottom walls and having its other end retained for sliding movement upon said bottom wall, operating means engaging said sheet between its ends for moving the mid-portion of said sheet toward said top wall for throttling the cross sectional area of said duct, said operating means comprising a vane, means mounting said vane between said sheet and bottom wall for oscillation about an axis extending transversely between said side walls.

REVILO E. BAILEY.

REFERENCES CITED

The following references are of record in the file of this patent:

UNITED STATES PATENTS

| Number | Name | Date |
|---|---|---|
| 2,424,654 | Gamble | July 29, 1947 |
| 2,472,949 | Jackson | June 14, 1949 |
| 2,546,673 | Mattix et al. | Mar. 27, 1951 |